US010167959B2

(12) United States Patent
Pears et al.

(10) Patent No.: US 10,167,959 B2
(45) Date of Patent: *Jan. 1, 2019

(54) RELIEF VALVES AND METHODS FOR INSTALLING THE SAME

(71) Applicant: SCEPTER US HOLDING COMPANY, Akron, OH (US)

(72) Inventors: Stephen Michael Pears, Ontario (CA); Hing Hung Sher, NT (HK)

(73) Assignee: SCEPTER US HOLDING COMPANY, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,690

(22) Filed: Nov. 30, 2017

(65) Prior Publication Data

US 2018/0100587 A1    Apr. 12, 2018

Related U.S. Application Data

(63) Continuation of application No. 14/800,185, filed on Jul. 15, 2015, now Pat. No. 9,835,255.

(51) Int. Cl.
| | | |
|---|---|---|
| *F16K 1/30* | (2006.01) | |
| *F16K 1/46* | (2006.01) | |
| *F16K 27/02* | (2006.01) | |
| *B23P 11/02* | (2006.01) | |
| *B65D 51/16* | (2006.01) | |
| *F16K 31/08* | (2006.01) | |

(Continued)

(52) U.S. Cl.
CPC .............. *F16K 1/30* (2013.01); *B23P 11/025* (2013.01); *B60K 15/03* (2013.01); *B65D 51/1672* (2013.01); *F16K 1/46* (2013.01); *F16K 24/06* (2013.01); *F16K 27/02* (2013.01); *F16K 31/084* (2013.01); *B60K 2015/03296* (2013.01)

(58) Field of Classification Search
CPC ... F16K 1/30; F16K 1/46; F16K 24/06; F16K 27/02; F16K 31/084; B23P 11/025; B65D 51/1672

See application file for complete search history.

(56) References Cited

U.S. PATENT DOCUMENTS 3,730,224 A * 5/1973 Prisk ......................... F16K 1/32
                                                                        137/625.33
9,835,255 B2 * 12/2017 Pears ......................... F16K 1/30

FOREIGN PATENT DOCUMENTS

CN            203549018 U    *  4/2014

OTHER PUBLICATIONS

Translation of CN203549018U Apr. 16, 2014, 4 pages.*

* cited by examiner

*Primary Examiner* — P. Macade Nichols
(74) *Attorney, Agent, or Firm* — Benesch, Friedlander, Coplan & Aronoff LLP

(57) ABSTRACT

A relief valve can include a valve body, a valve member, a valve stem, and a magnetic member. The valve body can define a flow path that extends between a first port and a second port. The valve body can include a valve seat disposed between the first port and the second port. The valve member can be disposed between the valve seat and the second port of the valve body. The valve member can move along an actuation axis. The valve stem can be coupled to the valve member. The valve stem can extend from the valve member towards the first port. The magnetic member (Continued)

can be coupled to the valve member and can generate a magnetic force that urges the valve member to seal with the valve seat of the valve body.

15 Claims, 11 Drawing Sheets

(51) Int. Cl.
*F16K 24/06* (2006.01)
*B60K 15/03* (2006.01)

RELIEF VALVES AND METHODS FOR INSTALLING THE SAME

RELATED APPLICATION

This application is a continuation of U.S. application Ser. No. 14/800,185 filed Jul. 15, 2015, and entitled "RELIEF VALVES AND METHODS FOR INSTALLING THE SAME," the contents of which are incorporated herein by reference.

TECHNICAL FIELD

The present specification generally relates to relief valves for venting fluid from a container and, more specifically, to relief valves for venting gasoline vapor from a gasoline container.

BACKGROUND

Fluid can be stored in closed containers. When the container with fluid is subjected to changing ambient conditions such as, for example, temperatures above that at which the fluid was originally dispensed into the container, the temperature increase can cause an undesired increase in pressure inside the container. For example, gasoline containers are often filled with gasoline at a relatively cool temperature and exposed to an increase in temperature. Specifically, a gasoline container can be filled with gasoline on a summer morning with an ambient temperature of about 50° F. (about 10° C.). Once filled, the container can be closed and stored in a non-temperature controlled environment such as a garage, a shed, or outdoors. As the ambient temperature increases throughout the day, the temperature of the contents can similarly increase. Even at an increase in temperature to about 85° F. (about 29° C.), the internal pressure of the gasoline container can increase to an undesired amount. Since gasoline is a volatile and flammable substance, such an increase in pressure can make use of the gasoline container for dispensing fuel into a device more difficult.

Some gasoline containers can be provided with a relief valve to release the pressure prior to use. For example, some molded plastic containers include a plastic cap that can be manually opened to relieve pressure from the plastic container. However, such plastic caps are prone to fatigue and may separate from the plastic container, which can cause a loss of fluid from the plastic container. Moreover, known relief valves can be difficult to install properly, which can result in leakage of fluid after installation.

Accordingly, a need exists for alternative relief valves for venting gasoline vapor from a gasoline container.

SUMMARY

In one embodiment, a relief valve can comprise, a valve body, a valve member, and a bias member. The valve body can define a flow path that extends between a first port and a second port. The valve body can include a valve seat disposed between the first port and the second port, a shoulder disposed along an outer contour of the valve body between the first port and the second port, and a sloped region disposed along the outer contour of the valve body between the shoulder and the second port. The valve seat can form a discontinuity in the flow path. The outer contour can taper inward at the sloped region. The valve member can be disposed between the valve seat and the second port of the valve body. The valve member can move along an actuation axis. The bias member can be disposed between the valve member and the second port of the valve body. The bias member can generate a force that urges the valve member to seal with the valve seat of the valve body.

In another embodiment, a relief valve can include a valve body, a valve member, a valve stem, and a magnetic member. The valve body can define a flow path that extends between a first port and a second port. The valve body can include a valve seat disposed between the first port and the second port. The valve seat can form a discontinuity in the flow path. The valve member can be disposed between the valve seat and the second port of the valve body. The valve member can move along an actuation axis. The valve stem can be coupled to the valve member. The valve stem can extend from the valve member towards the first port. The magnetic member can be coupled to the valve member and can be disposed between the valve member and the second port of the valve body. The magnetic member can generate a magnetic force that urges the valve member to seal with the valve seat of the valve body.

In another embodiment, a relief valve can include a valve body, a valve member, a clamping fastener, a resilient cap, a gasket, and a valve stem. The valve body can define a flow path that extends between a first port and a second port. The valve body can include a valve seat disposed between the first port and the second port. The valve seat can form a discontinuity in the flow path. Thea valve member can be disposed between the valve seat and the second port of the valve body. The valve member can move along an actuation axis. The valve member can be biased towards the valve seat. The clamping fastener can be in threaded engagement with the valve body at the first port of the valve body. The clamping fastener can include a flow orifice formed laterally through the clamping fastener with respect to the actuation axis. The resilient cap can be coupled to the clamping fastener. The resilient cap can include an actuation member that extends along the actuation axis and towards the first port of the valve body. The gasket can be disposed between the clamping fastener and the valve body. The gasket can comprise a fastener sleeve interfacing with the clamping fastener and a valve body sleeve interfacing with the valve body. The valve stem can be coupled to the valve member. The valve stem can extend from the valve member along the actuation axis and towards the actuation member.

In another embodiment, a relief valve can include a valve body, a valve member, a clamping fastener, a resilient cap, a gasket, a valve stem and a magnetic member. The valve body can define a flow path that extends between a first port and a second port. The valve body can include a valve seat disposed between the first port and the second port. The valve seat can form a discontinuity in the flow path. Thea valve member can be disposed between the valve seat and the second port of the valve body. The valve member can move along an actuation axis. The clamping fastener can be in threaded engagement with the valve body at the first port of the valve body. The clamping fastener can include a flow orifice formed laterally through the clamping fastener with respect to the actuation axis. The resilient cap can be coupled to the clamping fastener. The resilient cap can include an actuation member that extends along the actuation axis and towards the first port of the valve body. The gasket can be disposed between the clamping fastener and the valve body. The gasket can comprise a fastener sleeve interfacing with the clamping fastener and a valve body sleeve interfacing with the valve body. The valve stem can be coupled to the valve member. The valve stem can extend from the valve member along the actuation axis and towards the actuation member. The magnetic member can be coupled to the valve member and can be disposed between the valve member and the second port of the valve body. The magnetic member can generate a magnetic force that urges the valve member to seal with the valve seat of the valve body.

In yet another embodiment, a method for installing a relief valve into a container can include heating a container to a heated temperature. The heated temperature can be greater than room temperature. An orifice can be formed within the container, while the container is at the heated temperature. A relief valve can be inserted in the orifice, while the container is at the heated temperature. The relief valve can include a valve body, a clamping fastener and a gasket. The valve body can be in threaded engagement with the clamping fastener. The gasket can be disposed between the valve body and the clamping fastener. The gasket can include a fastener sleeve interfacing with the clamping fastener and a valve body sleeve interfacing with the valve body. The fastener sleeve can contact the container. The threaded engagement of the valve body and the clamping fastener can be adjusted. The gasket can be compressed, while the container is at the heated temperature. The container can be cooled after the gasket is compressed.

According to any of the relief valves or methods for installing relief valves provided herein, the relief valve can include a ferromagnetic insert coupled to a recessed feature formed in the valve body. The recessed feature can be formed concentric to the valve seat. Alternatively or additionally, the magnetic member and the ferromagnetic insert can interact such that the magnetic force is less than about 40 grams. Alternatively or additionally, the magnetic member and the ferromagnetic insert can interact such that the magnetic force is less than about 10 grams.

According to any of the relief valves or methods for installing relief valves provided herein, the valve body can include a chamfered region adjacent to the second port. Alternatively or additionally, the chamfered region can define a chamfer angle with respect to the second port. The chamfered angle can be acute.

According to any of the relief valves or methods for installing relief valves provided herein, the valve body can include a shoulder and a sloped region. The shoulder can be disposed along an outer contour of the valve body between the first port and the second port. The sloped region can be disposed along the outer contour of the valve body between the shoulder and the second port. The outer contour can taper inward at the sloped region.

According to any of the relief valves or methods for installing relief valves provided herein, the valve body can include a zinc alloy, a passivated zinc alloy, aluminum, or a thermoplastic.

According to any of the relief valves or methods for installing relief valves provided herein, the valve body can include a clamping fastener and a gasket. The clamping fastener can be in threaded engagement with the valve body. The gasket can be disposed between the clamping fastener and the valve body. The gasket can include a fastener sleeve interfacing with the clamping fastener and a valve body sleeve interfacing with the valve body. The fastener sleeve and the valve body sleeve can overlap to form a shoulder of the gasket. Alternatively or additionally, the gasket can include a resilient material having a hardness between about 40 duro and about 85 duro. Alternatively or additionally, the resilient material can be a fluoroelastomer or a nitrile rubber. Alternatively or additionally, the valve body sleeve of the gasket can include a valve body flange. The valve body can include a valve shoulder disposed along an outer contour of the valve body. The valve body flange and the valve shoulder can be in contact. Alternatively or additionally, the valve body flange can be larger than the valve shoulder. Alternatively or additionally, the valve body sleeve of the gasket can include a recess formed between the shoulder and the valve body flange.

According to any of the relief valves or methods for installing relief valves provided herein, the relief valve can include a clamping fastener in threaded engagement with the valve body. The clamping fastener can include a flow orifice formed laterally through the clamping fastener with respect to the actuation axis. Alternatively or additionally, the relief valve can include a resilient cap. The resilient cap can be coupled to the clamping fastener. The flow orifice can extend from a first end of the clamping fastener to a bottom of the flow orifice. The resilient cap can be offset from the bottom of the flow orifice by a vent span. Alternatively or additionally, the relief valve can include a valve stem. The valve stem can be coupled to the resilient cap and can extend towards the valve member. The valve stem can be offset from the valve member by an actuation span.

According to any of the relief valves or methods for installing relief valves provided herein, the clamping fastener can be urged towards an outer surface of the container contemporaneous to adjustment of the threaded engagement. Alternatively or additionally, the container can include a thermoplastic material.

According to any of the relief valves or methods for installing relief valves provided herein, the orifice can have a smaller diameter than the valve body, the valve body sleeve of the gasket, or both.

According to any of the relief valves or methods for installing relief valves provided herein, the bias member can include a magnetic member, and the force can be a magnetic force that has a magnitude less than about 10 grams. Alternatively or additionally, the bias member can include a spring, and the force can be a mechanical force that has a magnitude less than about 10 grams.

According to any of the relief valves or methods for installing relief valves provided herein, the valve body can be formed from a first body and a second body. The first body can include a first port and a coupling flange. The second body can include the shoulder. The coupling flange of the first body can be received by the second body. Alternatively or additionally, the first body can include a metallic material. The second body can include a rigid plastic.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein generally relate to relief valves for venting a closed container that stores fluid. The relief valve generally can comprise a valve body that surrounds a flow path that extends from a first port to a second port and a valve member that opens and closes the flow path. The valve member can be biased closed with a bias member that can provide a magnetic force or mechanical force. Various embodiments of the relief valve, methods for installing relief valves and operation of relief valves will be described in more detail herein.

Figure 1:
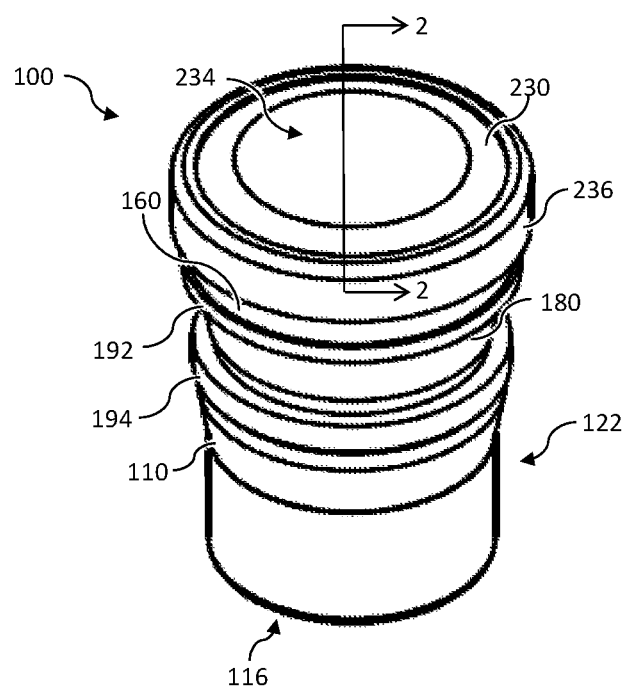
FIG. 1 schematically depicts a relief valve according to one or more embodiments shown and described herein.
Figure 2:
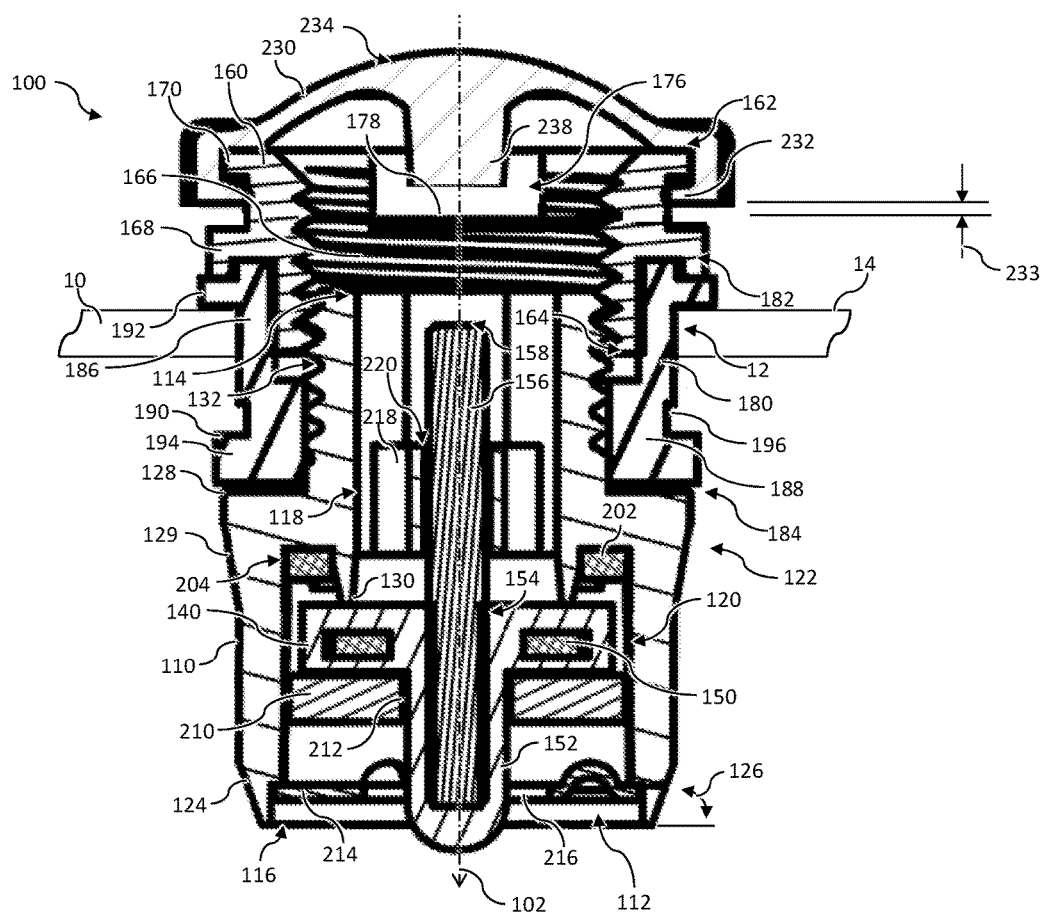
FIG. 2 schematically depicts a cross sectional view along line 2-2 of the relief valve of FIG. 1 according to one or more embodiments shown and described herein.
Figure 3:
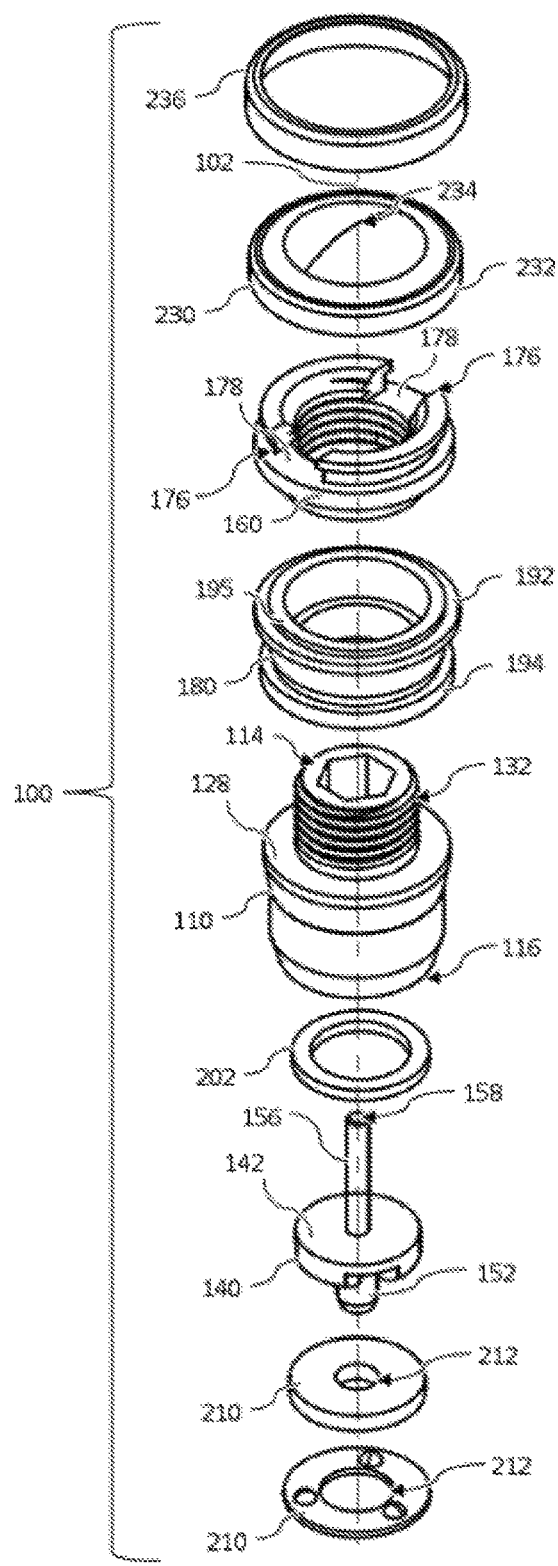
FIG. 3 schematically depicts an exploded view of the relief valve of FIG. 1 according to one or more embodiments shown and described herein.

Referring collectively to FIGS. 1-3, a relief valve 100 for selectively venting fluid from a container 10 such as, but not limited to, gasoline vapor from a gas container, is schematically depicted. As used herein the term "fluid" can mean a substance, such as a liquid or a gas, that is capable of flowing and that changes its shape at a steady rate when acted upon by a force tending to change its shape. The relief valve 100 can comprise valve body 110 that defines a flow path 112 for the flow of fluid throughout the relief valve 100. The valve body 110 can be formed from any material capable of resisting deformation when subjected to pressure such, as for example, metallic materials or rigid plastics. In some embodiments, the valve body 110 can be resistant to corrosion caused by the fluid. For example, in embodiments where the valve body 110 is exposed to gasoline, the valve body 110 can comprise metallic materials such as, for example, aluminum, anodized aluminum, zinc alloys, passivated zinc alloys, stainless steel, forged steel, iron (e.g., powdered iron) or the like. Alternatively or additionally, the valve body 110 can comprise thermoplastic materials such as, for example, nylon, Polytetrafluoroethylene (PTFE), Polyoxymethylene (POM), or the like.

Figure 4:
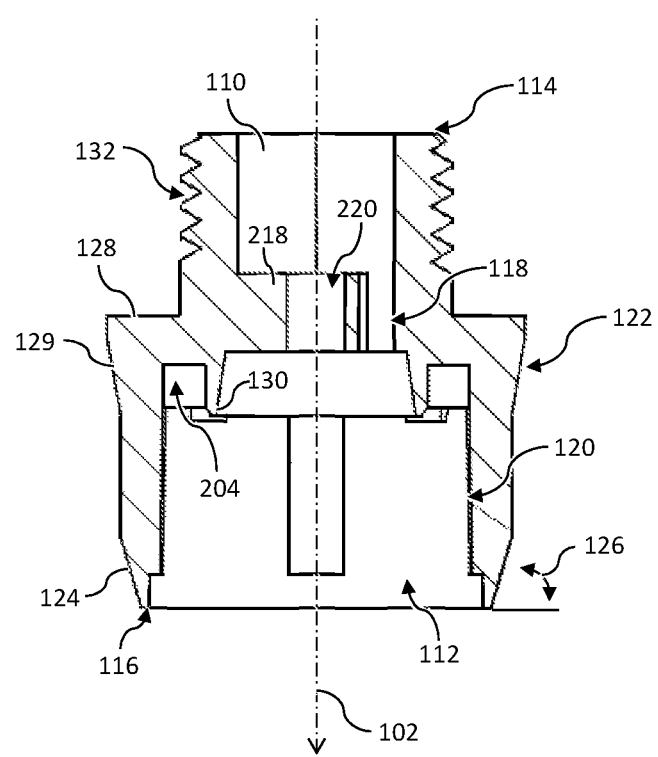
FIG. 4 schematically depicts a cross sectional view of a valve body according to one or more embodiments shown and described herein.
Figure 5A:
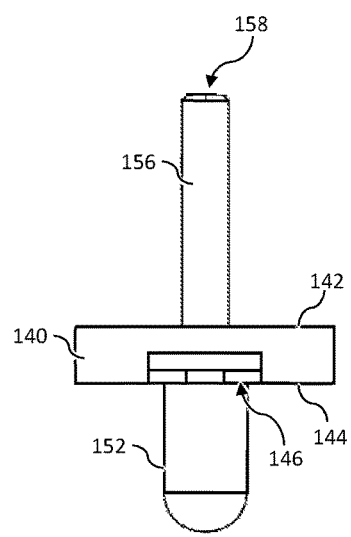
FIG. 5A schematically depicts a side view of the valve member of FIG. 3 according to one or more embodiments shown and described herein.
Figure 5B:
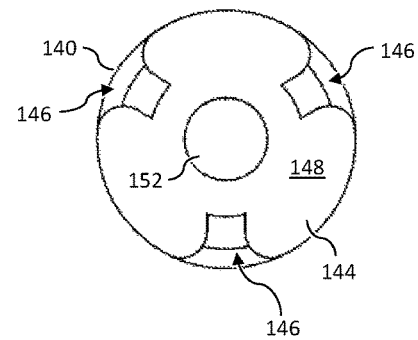
FIG. 5B schematically depicts a bottom view of the valve member of FIG. 3 according to one or more embodiments shown and described herein.

Referring collectively to FIGS. 2, 3, and 4, the flow path 112 can be formed through the valve body 110 and can extend from a first port 114 to a second port 116. Accordingly, when the flow path 112 is unobstructed, fluid can be permitted to flow from the first port 114 through the second port 116, from the second port 116 through the first port 114, or both. In some embodiments, the interior of the valve body 110 can form a stem portion 118 having a relatively small cross sectional area, and a sealing portion 120 having a relatively large cross sectional area. For example, the stem portion 118 of the valve body 110 can have a substantially hexagonal cross section. Accordingly, the valve body 110 can be configured to grip a tool within at the stem portion 118 to aid in installation of the relief valve 100. It is noted that, while the stem portion 118 of the valve body 110 is depicted as having a substantially hexagonal cross section, the stem portion 118 can be provided with any cross sectional shape suitable to engage a tool such as, for example, polygonal, slotted, star shaped, or the like. Alternatively or additionally, the sealing portion 120 of the valve body 110 can have a substantially circular cross section. The stem portion 118 and the sealing portion 120 can be disposed between the first port 114 and the second port 116. Accordingly, the flow path 112 can be bounded by the stem portion 118 and the sealing portion 120 such that the flow path 112 has a region with a relatively small cross sectional area at the stem portion 118, and a region with a relatively large cross sectional area at the sealing portion 120.

Referring again to FIGS. 2 and 4, the valve body 110 can comprise a valve seat 130 disposed within the interior of the valve body 110. The valve seat 130 can be configured to seal with a valve member 140 to substantially completely obstruct the flow path 112, i.e., the valve seat 130 can seal with the valve member 140 to stop the flow of fluid. In some embodiments, the valve seat 130 can be disposed between the first port 114 and the second port 116. Specifically, the valve seat 130 can be disposed at a transition between the sealing portion 120 and the stem portion 118 of the valve body 110. In some embodiments, the valve seat 130 can form a discontinuity in the flow path 112. For example, the interior of the valve body 110 can have a lack of smoothness or a disruption at the transition between the sealing portion 120 and the stem portion 118. For example, the valve seat 130 can form a ring that projects from the valve body 110 into the flow path 112. It is furthermore noted that, in some embodiments, the valve seat 130 can be concentric to and project into at least a part of the sealing portion 120 of the valve body 110.

Referring collectively to FIGS. 2, 3, 5A, and 5B, the relief valve 100 can comprise a valve member 140 that is configured to form a fluidic seal with the valve seat 130 of the valve body 110. The valve member 140 can comprise a sealing surface 142 for forming the fluidic seal with the valve seat 130. Accordingly, the sealing surface 142 can be correspondingly shaped to the valve seat 130. Alternatively or additionally, the sealing surface 140 can be formed from a resilient material such as, for example, a fluoroelastomer (e.g., FKM by ASTM D1418 standard), Nitrile rubber (e.g., Nitrile butadiene rubber (NBR)), urethane (e.g., polyurethane), or other rubber suitable for exposure to gasoline vapor. In some embodiments, the resilient material can be formulated to a desired hardness. The hardness can be between about 40 duro and about 85duro such as, for example, between about 50 duro and about 75 duro in one embodiment, or between about 60 duro and about 65 duro in another embodiment. It is noted that the term "duro," as used herein, indicates Shore hardness as measured by a durometer.

The valve member 140 can comprise an actuation body 144 configured to receive a force for sealing the valve member 140 to the valve seat 130. The actuation body 144 can be positioned on an opposing side of the valve member 140 to the sealing surface 142. For example, the valve member 140 can be a plate-like body (e.g., a disk, sheet, or the like). Accordingly, the sealing surface 142 can be located on a first side and the valve member 140 can be located on a second side. In some embodiments, the actuation body 144 can comprise one or more recessed regions 146 configured to promote fluid flow around the valve member 140. For example, each recessed region 146 can have substantially arcuate edges. Accordingly, a lead face 148 of the actuation body 144 can form a clover-like shape.

Referring again to FIG. 2, the valve member 140 can comprise a structural member 150 configured to mitigate distortion of the valve member 140. The structural member 150 can be a rigid member from a metallic material. In some embodiments, the valve member 150 can be formed by molding the resilient material around the structural member 150. Accordingly, the structural member 150 can be a plate-like body with a central orifice. In some embodiments, the structural member 150 can be configured for alignment with the valve seat 130. Thus, the central orifice of the structural member 150 can have a perimeter smaller than the valve seat 130, and the structural member 150 can have an outer perimeter that is larger than the valve seat 130. For example, in embodiments where the structural member 150 is substantially disk shaped and the valve seat 130 is substantially ring shaped, the inner diameter of the structural member 150 can be smaller than the diameter of the valve seat 130 and the outer diameter of the structural member 150 can be larger than the diameter of the valve seat 130.

Referring again to FIGS. 2, 3, 5A, and 5B, the valve member 140 can comprise an alignment member 152 configured to align the valve member 140 with an actuation axis 102 of the relief valve 100. The alignment member 152 can be an elongate body that projects away from the actuation body 144 of the valve member 140. In some embodiments, the alignment member 152 can extend substantially linearly. Accordingly, the alignment member 152 can be confined within a guide to provide motion the actuation axis 102.

According to the embodiments described herein, the relief valve 100 can comprise a valve stem 156 configured to actuate the valve member 140 away from the valve seat 130. The valve stem 156 can be an elongate body that projects away from the sealing surface 142 of the valve member 140 to an actuation end 158. In some embodiments, the valve stem 156 can be coupled to or integral with the valve member 140. For example, the valve stem 156 can be received within an orifice 154 formed substantially centrally in the valve member 140 and the alignment member 152. In some embodiments, the valve stem 156 can be friction fitted to the orifice of the valve member 140. In one embodiment, the valve stem 156 can be a cylindrically shaped rod having an outer diameter that is larger than the diameter of the orifice 154. In further embodiments, the valve stem 156 can be attached to the valve member 140 using any suitable mechanical attachment such as, for example, weld, crimp connection, adhesive, or the like. According to the embodiments described herein, the valve stem 156 can be formed from any rigid material such as a metallic material or rigid plastic. Suitable materials can include, but are not limited to, stainless steel, copper, aluminum, or the like.

Referring collectively to FIGS. 1-4, the valve body 110 can comprise an outer contour 122 configured to facilitate installation of the relief valve 100 into an orifice. In some embodiments, the outer contour 122 can comprise a substantially circular cross section shape. Alternatively or additionally, the outer contour 122 can comprise a chamfered region 124 adjacent to the second port 116. The chamfered region 124 can define a chamfer angle 126 with respect to the second port 116. According to the embodiments described herein, the chamfer angle 126 can be substantially acute such as, for example, between about 65° and about 85° in one embodiment, or between about 70° and about 80°.

The outer contour 122 can have a maximum diameter at a shoulder 128 of the valve body 110. The shoulder 128 can be disposed along the valve body 110 between the first port 114 and the second port 116. The outer contour 122 can taper inwards as the outer contour 122 extends from the shoulder 128 to the second port 116, i.e., the diameter of the outer contour 122 can decrease as the outer contour 122 extends from the shoulder 128 to the second port 116. In some embodiments, the outer contour 122 can comprise a sloped region 129 between the shoulder 128 and the chamfered region 124. The sloped region 129 can have a relatively large slope, i.e., rate of diameter change, compared with the remainder of the outer contour 122 between the shoulder 128 and the chamfered region 124.

The outer contour 122 of the valve body 110 can further be configured to cooperate with a clamping fastener 160 to provide an expansion connection. Accordingly, the outer contour 122 can comprise a threaded region 132 disposed between the shoulder 128 and the first port 114 of the valve body 110. In some embodiments, the diameter of the threaded region 132 can be less than the diameter of the valve body 110 at the shoulder 128.

Figure 6:
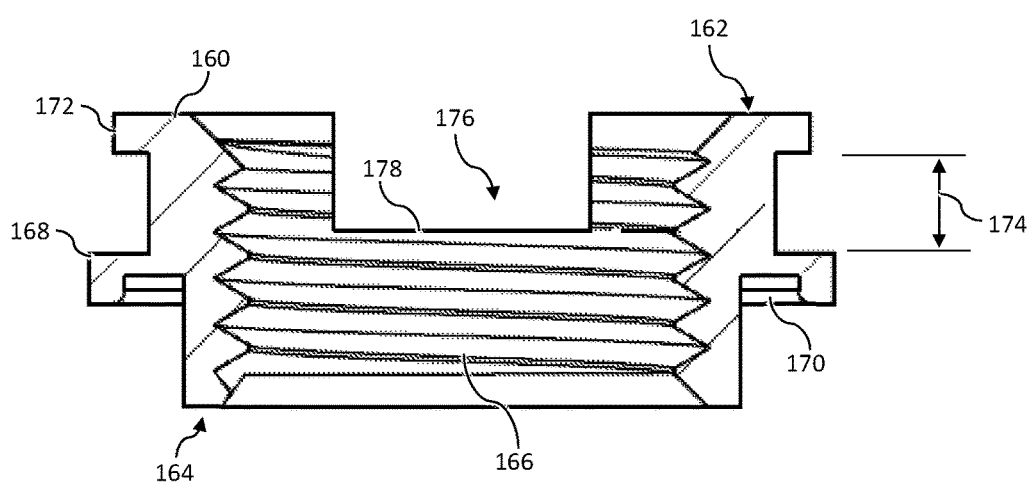
FIG. 6 schematically depicts a cross sectional view of the clamping fastener of FIG. 3 according to one or more embodiments shown and described herein.

Referring again to FIGS. 2, 3 and 6, the relief valve 100 can comprise a clamping fastener 160 configured to cooperate with the valve body 110 to provide an expansion connection. Specifically, the clamping fastener 160 can be configured for threaded engagement with the threaded region 132 of the valve body 110. Accordingly, the clamping fastener 160 and the valve body 110 can be configured to compress and expand a gasket 180 to form a seal with the container 10. The clamping fastener 160 can extend between a first end 162 and a second end 164. In some embodiments, the clamping fastener 160 can comprise a threaded orifice 166 for forming a threaded engagement with the threaded region 132 of the valve body 110 and a clamping flange 168 disposed between the first end 162 and the second end 164 of the clamping fastener 160 for applying force to the gasket 180. The threaded orifice 162 can be a substantially cylindrical bore having threads corresponding to the threaded region 132 of the valve body 110. For example, the threaded region of the valve body 110 can be received within the threaded orifice 166 at the second end 164 of the clamping fastener 160 to form the threaded engagement. Accordingly, the threaded engagement can be tightened to reduce the span between the clamping flange 168 of the clamping fastener 160 and the shoulder 128 of the valve body 110. Additionally, the threaded engagement can be loosened to increase the span between the clamping flange 168 of the clamping fastener 160 and the shoulder 128 of the valve body 110. According to the embodiments described herein, the clamping fastener 160 can be formed from any rigid material such as a metallic material or hard plastic. Suitable materials can include, but are not limited to, passivated zinc alloy, aluminum, or the like.

In some embodiments, the clamping flange 168 can extend away from the outer surface of the clamping fastener 160. Accordingly, the clamping flange 168 can provide a projecting rim that confines the gasket 180 in a desired orientation. Additionally, the clamping flange 168 can comprise a recessed feature 170 configured to interlock with the gasket 180. It is noted that, while the recessed feature 170 is depicted as a notch having a substantially rectangular cross section formed radially inwardly on the clamping flange 168, the recessed feature 170 can be provided with any cross section corresponding to an interlocking feature of the gasket 180 such as, but not limited to, substantially triangular, substantially circular, or the like.

The clamping fastener 160 can further comprise a cap flange 172 for mating with a resilient cap 230. The cap flange 172 can be a protruding rim that is disposed at the first end 162 of the clamping fastener 160. Accordingly, the cap flange 172 can be offset from the clamping flange 168 by a flange span 174. Alternatively or additionally, the clamping fastener 160 can comprise one or more flow orifices 176 for permitting fluid to flow laterally through the clamping fastener 160 with respect to the actuation axis 102. In some embodiments, the one or more flow orifices 176 can be formed at the first end 162 of the clamping fastener 160 such that a bottom 178 of the flow orifice 176, i.e., closest portion of the flow orifice 176 to the clamping flange 168, is positioned within the flange span 174. In one embodiment, the bottom 178 of the flow orifice 176 can be positioned within the flange span 174 such that the bottom 178 of the flow orifice 176 is closer to the clamping flange 168 than the cap flange 172, i.e., the flow orifice 176 can extend from the first end 162 to a position beyond a midpoint of the flange span 174.

Referring again to FIGS. 2, 3 and 7, the relief valve 100 can comprise a gasket 180 configured to seal the relief valve 100 within an orifice 12 of the container 10 to substantially prevent any fluid flow around the relief valve 100. Accordingly, the gasket 180 can be formed from a resilient material, as noted above. Suitable materials can include, but are not limited to, FKM, nitrile rubber, urethane, chlorinated polyethylene (CPE), or the like. In some embodiments, the gasket 180 can be formulated to a desired hardness. The hardness can be between about 40 duro and about 85 duro such as, for example, between about 65 duro and about 75 duro in one embodiment, or between about 60 duro and about 65 duro in another embodiment. Alternatively or additionally, the gasket 180 can be formulated to withstand shear stress up to a shear stress limit without tearing. In some embodiments, the shear stress limit can be greater than about 15 kg-f such as, for example, between about 15 kg-f and 60 kg-f in one embodiment, or between about 20 kg-f and 40 kg-f in another embodiment.

The gasket 180 can be a substantially tubular body that extends from a first end 182 to a second end 184. The gasket 180 can comprise a fastener sleeve 186 configured to interface with the clamping fastener 160 and the container 10, and a valve body sleeve 188 configured to interface with the valve body 110. The fastener sleeve 186 can extend from the first end 182 of the of the gasket 180 to the valve body sleeve 188. The valve body sleeve 188 can extend from the fastener sleeve 186 to the second end 184 of the gasket 180. In some embodiments, the fastener sleeve 186 can have a larger diameter than the valve body sleeve 188. Accordingly, the gasket 180 can comprise a shoulder 190 formed by an intersection or overlap of the fastener sleeve 186 and the valve body sleeve 188.

In some embodiments, the first end 182 of the gasket 180 can be configured to provide surface to surface contact with the clamping flange 168 of the clamping fastener 160. Specifically, the gasket 180 can comprise a fastener flange 192 located adjacent to the first end 182 of the gasket 180. In some embodiments, the fastener flange 192 can be offset towards the second end 184 of the gasket 180 such that a retention feature 195 is formed at the first end 182 of the gasket 180. The retention feature 195 can be configured to interlock with the recessed feature 170 of the clamping flange 168. Accordingly, while the retention feature 195 is depicted as having a protruding rim with a substantially rectangular cross section, the retention feature 195 can be provided with any cross section suitable to interlock with the recessed feature 170 of the clamping flange 168, as noted above.

Figure 7:
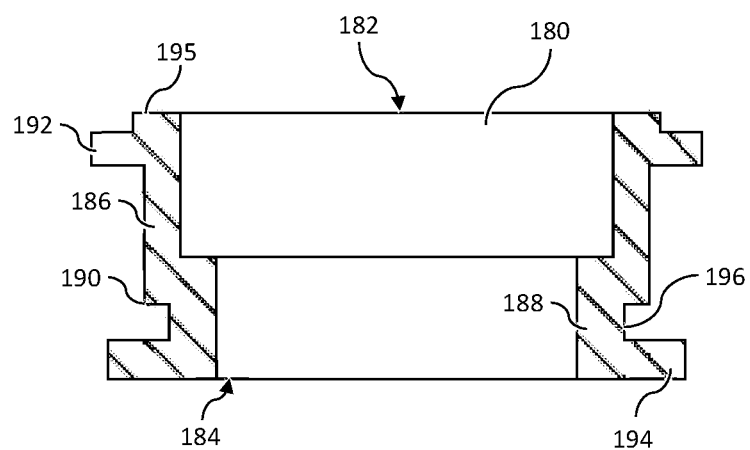
FIG. 7 schematically depicts a cross sectional view of the gasket of FIG. 3 according to one or more embodiments shown and described herein.

Referring still to FIGS. 2, 3 and 7, the valve body sleeve 188 of the gasket 180 can comprise a valve body flange 194 for providing surface to surface contact with the valve body 110. The valve body flange 194 can be disposed at the second end 184 of the gasket 180 and protrude radially outward. In some embodiments, the gasket 180 can be oversized compared to the valve body 110 to promote improved sealing with the container 10. For example, the valve body flange 194 of the gasket 180 can be larger than the shoulder 128 of the valve body 110. In embodiments where the valve body flange 194 of the gasket 180 and the shoulder 128 of the valve body 110 have a substantially circular cross section, the outer diameter of the valve body flange 194 can be larger than the outer diameter of the shoulder 128. In some embodiments, the valve body flange 194 can be configured to deflect during installation of the relief valve 100. Accordingly, the gasket 180 can comprise a recess 196 formed adjacent to the valve body flange 194. For example, the recess 196 can be formed in the valve body sleeve 188 between the shoulder 190 and the second end 184 of the gasket 180.

Referring again to FIGS. 2 and 3, the relief valve 100 can comprise components positioned within the valve body 110 for aligning and biasing the valve member 140. In some embodiments, the relief valve 100 can comprise a ferromagnetic insert 202 configured to interact with other components to bias the valve member 140 to a closed position, i.e., forming a fluidic seal with the valve seat 130. The ferromagnetic insert 202 can be formed from any material that is reactive to a magnetic object such that an attractive or repulsive force is generated. Suitable materials can comprise iron (e.g., steel), nickel, cobalt, or the like. The relief valve 100 can be configured such that the ferromagnetic insert 202 and the moving components of the relief valve 100 are kept out of physical contact. For example, the ferromagnetic insert 202 can be coupled within a recessed feature 204 formed in the valve body 110. Specifically, the recessed feature 204 can be formed concentric to the valve seat 130 and disposed between the shoulder 128 of the valve body 110 and the second port 116 of the valve body 110. The recessed feature 204 and the ferromagnetic insert 202 can be correspondingly shaped. It is noted that, while the ferromagnetic insert 202 is depicted as a substantially disk shaped ring, the ferromagnetic insert can be provided in any shape that can be incorporated within a correspondingly shaped recessed feature 204.

The valve member 140 can be received within the sealing portion 120 of the valve body 110. Specifically, the valve member 140 can be positioned between the valve seat 130 and the second port 116 of the valve body 110. In operation, the valve member 140 can move along the actuation axis 102 positioned between the valve seat 130 and the second port 116 of the valve body 110. Accordingly, the valve member 140 can be sized to have clearance with respect to the sealing portion 120 of the valve body 110.

The relief valve 100 can comprise a bias member for biasing the valve member 140 towards the valve seat 130 such as, for example, a magnetic member 210. The magnetic member 210 can comprise a permanent magnet, i.e., an object formed from ferromagnetic material that has an internal structure that has been magnetized such that the ferromagnetic material generates a magnetic field for a period of use. Suitable ferromagnetic material includes iron, nickel, cobalt, alloys of rare earth metals, or the like. The magnetic member 210 can be coupled to the valve member 140 and disposed between the valve member 140 and the first port 114 of the valve body 110. In some embodiments, the magnetic member 210 can be coupled to the alignment member 152 such that the magnetic member 210 moves in concert with the actuation body 144. For example, the magnetic member 210 can comprise a mounting orifice 212 configured to receive the alignment member 152 of the valve member 140. In one embodiment, the diameter of the mounting orifice 212 can be sized to promote a friction fit with the alignment member 152, i.e., the mounting orifice 212 can be smaller than the cross section of the alignment member 152. It is noted that, while the magnetic member 210 is depicted as a substantially disk shaped ring, the magnetic member 210 can be provided in any shape that can fit within the sealing portion 118 of the valve body 110 without contacting the valve body 110. In further embodiments, the magnetic member 210 can be integral with the valve member 140.

The magnetic member 210 can be configured to generate a magnetic force that urges the valve member 140 to seal with the valve seat 130 of the valve body 110. Specifically, the valve member 140 and the valve seat 130 can be disposed between the ferromagnetic insert 202 and the magnetic member 210. The magnetic force generated between the ferromagnetic insert 202 and the magnetic member 210 can be attractive such that the magnetic force urges the ferromagnetic insert 202 and the magnetic member 210 together. As a result, the magnetic force can urge the valve member 140 and the valve seat 130 together. In some embodiments, the magnetic force generated between the ferromagnetic insert 202 and the magnetic member 210 can be tailored to a specific magnitude for desired operating conditions. For example, the magnetic force can be configured to allow for automatic venting when the pressure in the stem portion 118 of the flow path 112 is greater than the pressure in the sealing portion 120 of the flow path 112. Such a pressure condition for automatic venting can occur when the container 10 is dispensing fluid. Accordingly, the magnetic force can be set to a magnitude of less than about 10 grams of force such as, for example, between about 2 grams of force and about 7 grams of force in one embodiment, or between about 4 grams of force and about 5 grams of force in another embodiment. Alternatively, the magnetic force can be configured to mitigate automatic venting. Accordingly, the magnetic force can be set to a magnitude of less than about 50 grams of force such as, for example, between about 10 grams of force and about 45 grams of force in one embodiment, or between about 15 grams of force and about 40 grams of force in another embodiment.

Referring still to FIGS. 2 and 3, the relief valve 100 can comprise a stem retainer 214 for bounding the range of motion of the valve member 140. Specifically, the stem retainer 214 can stop the actuation body 144 of the valve member 140 and the magnetic member 210 at a position between the valve seat 130 and the second port 116. Accordingly, the stem retainer 214 can be coupled to the valve member 110 adjacent to the second port 116. The stem retainer 214 can be formed from a rigid material, as noted above. In one embodiment, the stem retainer 214 can comprise nylon. In some embodiments, the stem retainer 214 can be configured to only partially block the second port 116, i.e., the stem retainer 214 can be configured to permit the flow of fluid though the second port 116. For example, the stem retainer 214 can be substantially plate shaped member comprising an orifice 216. The stem retainer 214 can further be configured to align the valve member 140 with the actuation axis 102. In some embodiments, the stem retainer 214 can be coupled to the valve body 110 such that the orifice 216 is substantially centered to the actuation axis 102. The alignment member 152 of the valve member 140 can be receive within the orifice 216 such that the alignment member 152 is constrained by the stem retainer 214. Alternatively or additionally, the orifice 216 of the stem retainer 214 can be configured to permit fluid flow. Accordingly, the orifice 216 can be oversized compared to the alignment member 152, which can permit some deviation of the alignment member 152 from the actuation axis 102.

Referring now to FIGS. 2 and 4, the valve stem 156 can be coupled to the valve member 140 and configured to communicate force to the valve member 140 to open the relief valve 100, i.e., the valve stem 156 be urged towards the second port 116 to move the valve member 140 away from the valve seat 130. In some embodiments, the actuation end 158 of the valve stem 156 can be positioned within the stem portion 118 of the valve body 110. Accordingly, the actuation end 158 of the valve stem 156 can be accessible through the first port 114 of the valve body 110. The valve stem 156 can furthermore be configured to align the valve member 140 to the actuation axis 102. Specifically, the valve stem 156 can be confined within an alignment body 218 disposed within the stem portion 118 of the valve body 110. The alignment body 218 can comprise a stem orifice 220 that is substantially centered to the actuation axis 102. Accordingly, the valve stem 156 can be received within the stem orifice 220 and constrained into alignment with the actuation axis 102. In some embodiments, the alignment body 218 can be integral to the valve body 110. Alternatively, the alignment body 218 can be provided as an insert that is coupled to the stem portion 118 of the valve body 110. Accordingly, the alignment body 218 can be formed from the same or an alternative material as the valve body 110. Suitable materials can comprise POM, PTFE, or the like.

Referring collectively to FIGS. 2, 3, 6 and 7, the gasket 180 can be disposed between the valve body 110 and the clamping fastener 160. In some embodiments, the threaded region of the valve body can be received by the valve body sleeve 188 of the gasket 180. Alternatively or additionally, the valve body flange 194 of the gasket 180 and the shoulder 128 of the valve body 110 can be urged into contact with one another. Accordingly, the relief valve 100 can provide a force that compresses the valve body flange 194 of the gasket 180 and the shoulder 128 of the valve body 110 together to form a fluidic seal. In some embodiments, the clamping fastener 160 can form a threaded engagement with the valve body 110. The threaded engagement can compress the gasket 180, which can result in a deformation of the gasket 180. In other words, a span between the fastener flange 192 and the valve body flange 194 of the gasket 180 can be reduced to cause the gasket 180 to deform or increase in diameter.

According to the embodiments described herein, the second end 164 of the clamping fastener 160 can be received by the fastener sleeve 186 of the gasket 180. Specifically, the fastener sleeve 186 of the gasket 180 can at least partially surround the second end 164 of the clamping fastener 160. Additionally, the clamping flange 168 of the clamping fastener 160 can be urged into contact with the valve body flange 194 of the gasket 180 by the threaded engagement of the relief valve 100. Accordingly, the valve body flange 194 of the gasket 180 can be compressed by the clamping flange 168 of the clamping fastener 160 to form a fluidic seal. Alternatively or additionally, the recessed feature 170 of the clamping flange 168 can receive the retention feature 195 of the first end 182 of the gasket 180. Thus, the recessed feature 170 and the retention feature 195 can cooperate to align the gasket 180 with respect to the clamping flange 160. Moreover, the recessed feature 170 and the retention feature 195 can cooperate to form a tortuous path to enhance the fluidic seal formed between the clamping flange 168 of the clamping fastener 160 and the valve body flange 194 of the gasket 180.

Referring collectively to FIGS. 1-3, the relief valve 100 can comprise a resilient cap 230 disposed above the first port 114 of the valve body 110. The resilient cap 230 can be configured for repeated deformation, i.e., actuation. Accordingly, the resilient cap 230 can be formed from a resilient material such as, for example, Thermoplastic polyurethane (TPU), Low-density polyethylene (LDPE), Linear low-density polyethylene (LLDPE) or Polyethylene terephthalate (PET), or other thermoplastic suitable for repeated deformation. In some embodiments, the hardness of the resilient cap 230 can be between about 40 duro and about 70 duro such as, for example, between about 45 duro and about 65 duro in one embodiment, or between about 50 duro and about 60 duro in another embodiment. In some embodiments, the resilient cap 230 can comprise a flange member 232 and a domed region 234 that has substantially hemispherical shape. Specifically, the domed region 234 can curve away from the flange member 232 and form a rounded peak.

In some embodiments, the resilient cap 232 can be coupled to the first end 162 of the clamping fastener 160. Specifically, the flange member 232 of the resilient cap 230 can be engaged with the cap flange 172 of the clamping fastener 160. Accordingly, the resilient cap 230 can be deformed while remaining coupled to the clamping fastener 160. In further embodiments, the resilient cap 230 can comprise a reinforcement rim 236 disposed around the flange member 232 to strengthen the coupling between the resilient cap 232 and the clamping fastener 160. The reinforcement rim 236 can be formed from a rigid material such as, but not limited to, rigid plastics or metallic materials (e.g., aluminum, copper, or stainless steel). In some embodiments, the flange member 232 can be offset from the bottom 178 of the flow orifice 176 of the clamping fastener 160 by a vent span 233. Accordingly, the vent span 233 allow fluid flow via the flow orifice 176 while the resilient cap 232 is coupled to the clamping fastener 160.

The resilient cap 232 can be configured to actuate the valve stem 156 and the valve member 140 when deformed. In some embodiments, the resilient cap 230 can comprise an actuation member 238 disposed in the domed region 234 of the resilient cap 230. The actuation member 238 can be an elongate body that extends towards the first port 114 of the valve body 110. The actuation member 238 and the valve stem 156 can be substantially aligned along the actuation axis 102. When the valve member 140 is sealed to the valve seat 130 and the resilient cap is in a non-deformed state, the actuation member 238 can be offset from the actuation end 158 of the valve stem 156. When a force is applied to the domed region 234 along the actuation axis 102, the domed region 234 can be deformed and collapse towards the first port 114 of the valve body 110. Accordingly, the actuation member 238 can be urged toward the actuation end 158 of the valve stem 156. With continued actuation, the actuation member 238 can be urged into contact with the actuation end 158 of the valve stem 156 and cause the valve stem 156 and the valve member 140 to move towards the second port 116 of the valve body 110. The force applied to the domed region 234 can overcome the magnetic force of the magnetic member 210 to separate the valve member 140 from the valve seat 130 and open the relief valve 100. Accordingly, fluid can flow throughout the flow path 112 of the valve body 110 and the flow orifices 176 of the clamping flange 160. When the force is removed, the resilient cap 232 can automatically return to a non-deformed state. Additionally, the magnetic force of the magnetic member 210 can automatically cause the valve member 140 to return to the valve seat 130 and close the relief valve 100.

Figure 8:
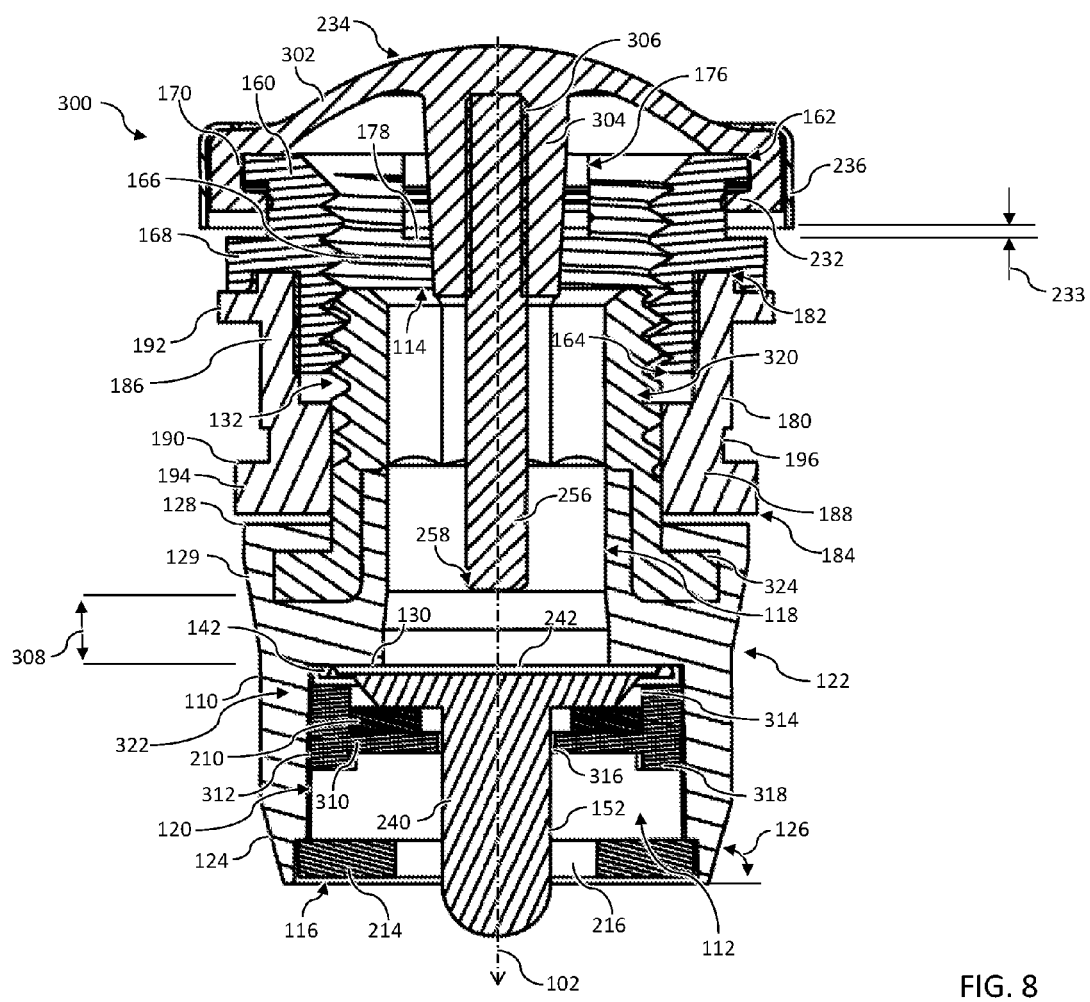
FIG. 8 schematically depicts a cross sectional view of a relief valve according to one or more embodiments shown and described herein.
Figure 9:
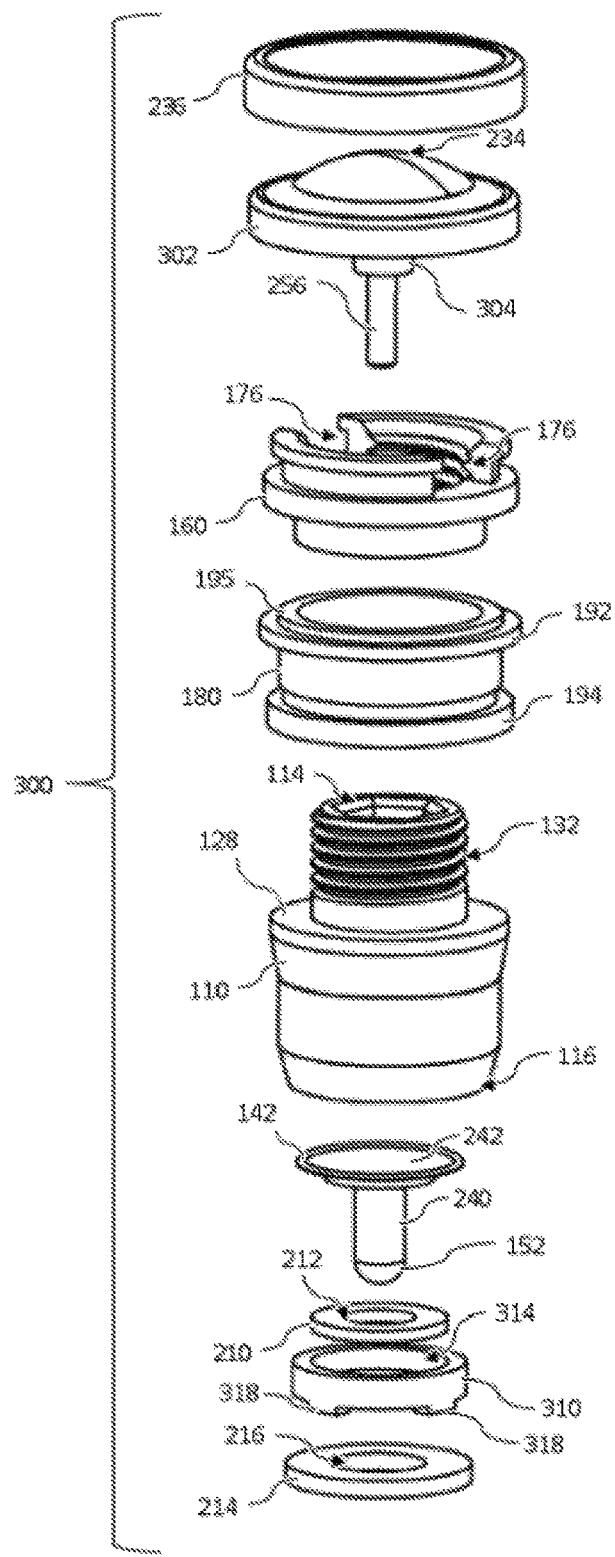
FIG. 9 schematically depicts an exploded view of the relief valve of FIG. 8 according to one or more embodiments shown and described herein.

Referring collectively to FIGS. 2, 8 and 9, an embodiment of a relief valve 300 is schematically depicted. In some embodiments, the relief valve 300 can comprise a resilient cap 302 that is configured to actuate the relief valve 300. The resilient cap 302 can be substantially similar to the resilient cap 230. Additionally, the resilient cap 302 can comprise an actuation member 304 that is configured to be coupled to a valve stem 256. In some embodiments, the actuation member 304 can extend from the underside of the domed region 234 of the resilient cap 302, along the actuation axis 102, and towards the second port 116 of the valve body 110. The valve stem 256 can be received within a stem orifice 306 of the actuation member 304. In some embodiments, the stem orifice 306 can be configured to be coupled to the valve stem 256 via a friction fit. Alternatively or additionally, the valve stem 256 can be coupled to the resilient cap 302 via any suitable mechanical attachment. According to the embodiments described herein, the valve stem 256 can be formed from any rigid material, as described herein with respect to the valve stem 156.

The valve stem 256 can extend from the actuation member 304 to an actuation end 258 that can be configured to actuate a valve member 240. Specifically, the actuation member 304 can extend from the actuation member 304, along the actuation axis 102, and towards the second port 116 of the valve body 110 such that the actuation end 258 is offset from an actuation body 242 of the valve member 240 by an actuation span 308. The valve member 240 can be configured to be in the closed position, when the actuation body 242 is offset from the valve stem 256. In use, the domed region 234 of the resilient cap 302 can be urged along the actuation axis 102, which can urge the actuation end 258 of the valve stem 256 into contact with the actuation body 242 of the valve member 240. Accordingly, the domed region 234 of the resilient cap 302 can be urged along the actuation axis 102 to cause the valve stem 256 to traverse the actuation span 308. Further urging of the domed region 234 of the resilient cap 302 along the actuation axis 102 can cause the valve member 240 to open the relief valve 300.

For example, the actuation body 242 can be configured to receive force communicated from the valve stem 256. In some embodiments, the actuation body 242 can comprise a substantially planar portion for receiving the actuation end 258 of the valve stem 256. Specifically, the actuation body 242 and the actuation end 258 of the valve stem 256 can be substantially parallel to one another. Prior to being urged into contact with one another, the actuation body 242 can be positioned within the sealing portion 120 of the flow path 112 and the valve stem 256 can be positioned within the stem portion 118 of the flow path 112. Alternatively or additionally, the actuation body 242 can be correspondingly shaped to the actuation end 258 of the valve stem 256 such that the actuation body 242 and the actuation end 258 of the valve stem 256 are keyed to one another. In some embodiments, the sealing surface 142 of the valve member 240 can be substantially concentric to the actuation body 242. Thus, when the valve member 240 is in the closed position, the sealing surface 142 can form a fluidic seal with the valve seat 130 of the valve body 110. Accordingly, when the relief valve 300 is opened, the fluidic seal between the valve seat 130 and the sealing surface 142 of the valve member 240 can be separated.

Referring collectively to FIGS. 8 and 9, the relief valve 300 can comprise a guide member 310 configured to constrain the motion of the valve member 240 as the valve member travels along the actuation axis 102. In some embodiments, the guide member 310 can be formed from a material that reduces friction between the guide body 312 and the sealing portion 120 of the flow path 112 such as, for example, nylon, POM, HDPE, PTFE, or other low friction plastics. In embodiments comprising the magnetic member 210, the guide member 310 can further comprise iron powder to promote magnetic interaction.

For example, the guide member 310 can be shaped to correspond to the sealing portion 120 of the flow path 112 such that the outer surface of the guide member 310 can slide along the sealing portion 120 as the guide member 310 moves along the actuation axis 102. Specifically, the guide member 310 can be substantially cylindrically shaped such that the guide member 310 can be received within the sealing portion 120 of the flow path 112. Moreover, the guide member 310 can be sized to provide clearance between the outer surface and the sealing portion 120 of the flow path 112. Alternatively or additionally, the guide member 310 and the sealing portion 120 of the flow path 112 can comprise ant-rotation features that are configured to mitigate rotation of the guide member 310 such as, for example, corresponding ribbed members and recesses.

According to the embodiments described herein, the guide member 310 can be configured to be coupled to the magnetic member 210. In some embodiments, the guide member 310 can comprise a magnet recess 314 that is configured to receive the magnetic member 210. Accordingly, the magnet recess 314 and the magnetic member 210 can be correspondingly shaped. For example, the magnetic member 210 can be friction fitted to the magnet recess 314 of the guide member 310. In one embodiment, the magnet recess 314 can be a substantially cylindrically shaped bore having a diameter that is smaller than the outer diameter of the magnetic member 210. Alternatively or additionally, the magnetic member 210 can be attached to the guide member 310 using any suitable mechanical attachment.

The guide member 310 can furthermore be configured to be coupled to the valve member 240. Accordingly, in some embodiments, the guide member 310 can travel along the actuation axis 102 in concert with the magnetic member 210 and the guide member 310. For example, the alignment member 152 can be received within an orifice 316 formed substantially centrally in the guide member 310. In some embodiments, the alignment member 152 of the valve member 240 can be friction fitted to the orifice 316 of the guide member 310. In one embodiment, the orifice 316 can be a substantially cylindrically shaped bore having a diameter that is smaller than the outer diameter of the alignment member 152. In some embodiments, the magnet member 210 can be disposed between the guide member 310 and the valve member 240. Alternatively, the guide member 310 can be disposed between the magnet member 210 and the valve member 240. The guide member 310 can further comprise one or more protruding members 318 configured to contact the stem retainer 214 and constrain the motion of the guide member 310 along the actuation axis 102. In some embodiments, each of the protruding members 318 can be spaced from one another and project away from the guide member 310 towards the second port 116. Accordingly, when the protruding members 318 contact the stem retainer 214, fluid can flow around the guide member 310.

Referring still to FIGS. 8 and 9, the valve body 110 can be formed from multiple materials. For example, the valve body 110 can comprise a first body 320 that is coupled to a second body 322. In use, the second body 322 can have greater exposure to fluid than the first body 324. Accordingly, the first body 320 can be formed from any of the metallic materials described herein and the second body 322 can be formed from any of the rigid plastics described herein. Suitable materials for the first body 320 can include, but are not limited to, forged steel, powdered iron, or the like. It is noted that, in embodiments comprising the magnetic member 210, it may be desirable to form the first body 320 from a magnetically reactive metallic, e.g., metaling including iron. Suitable materials for the second body 322 can include, but are not limited to, nylon, PTFE, POM, or combinations thereof.

According to the present disclosure, the first body 320 can form the first port 116 and the threaded portion 132 of the valve body 110. The second body 322 can form the second port 118 and the outer contour 122 of the valve body 110. The flow path 112 can traverse the first body 322 and the second body 322. In some embodiments, the stem portion 118 of the flow path 112 can be partially formed by the first body 320 and partially formed by the second body 322. Alternatively or additionally, the sealing portion 120 of the flow path 112 can be formed by the second body 322.

The first body 320 can be coupled to the second body 322 using any suitable mechanical attachment. In some embodiments, the first body 320 can comprise a coupling flange 324 configured to be received within the second body 322. For example, the second body 322 can be molded around the coupling flange 324 of the first body 320. The coupling flange 324 can be disposed between the first port 114 and the sealing portion 120 of the flow path 114 with respect to the actuation axis 102. In one embodiment, the coupling flange 324 can be disposed between the shoulder 128 and the valve seat 130 of the second body 322 of the valve body 110.

Figure 10:
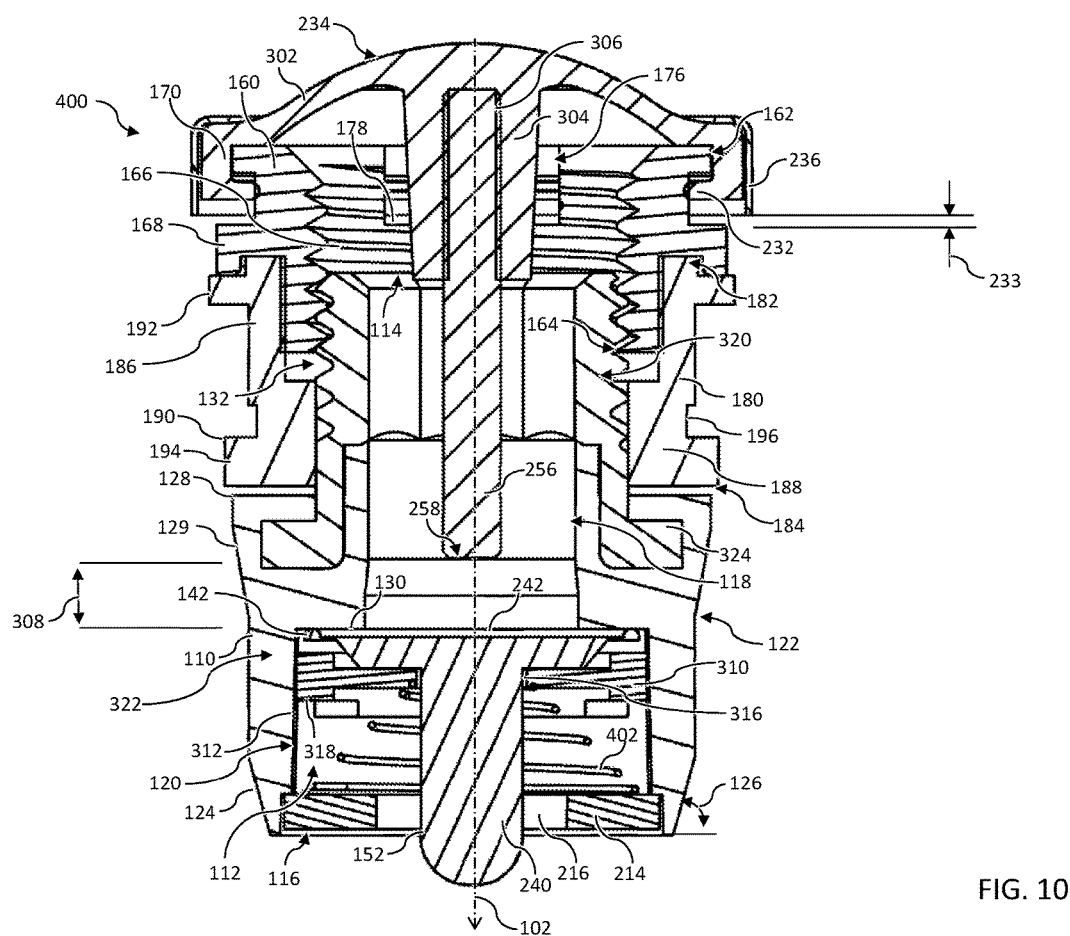
FIG. 10 schematically depicts a cross sectional view of a relief valve according to one or more embodiments shown and described herein.
Figure 11:
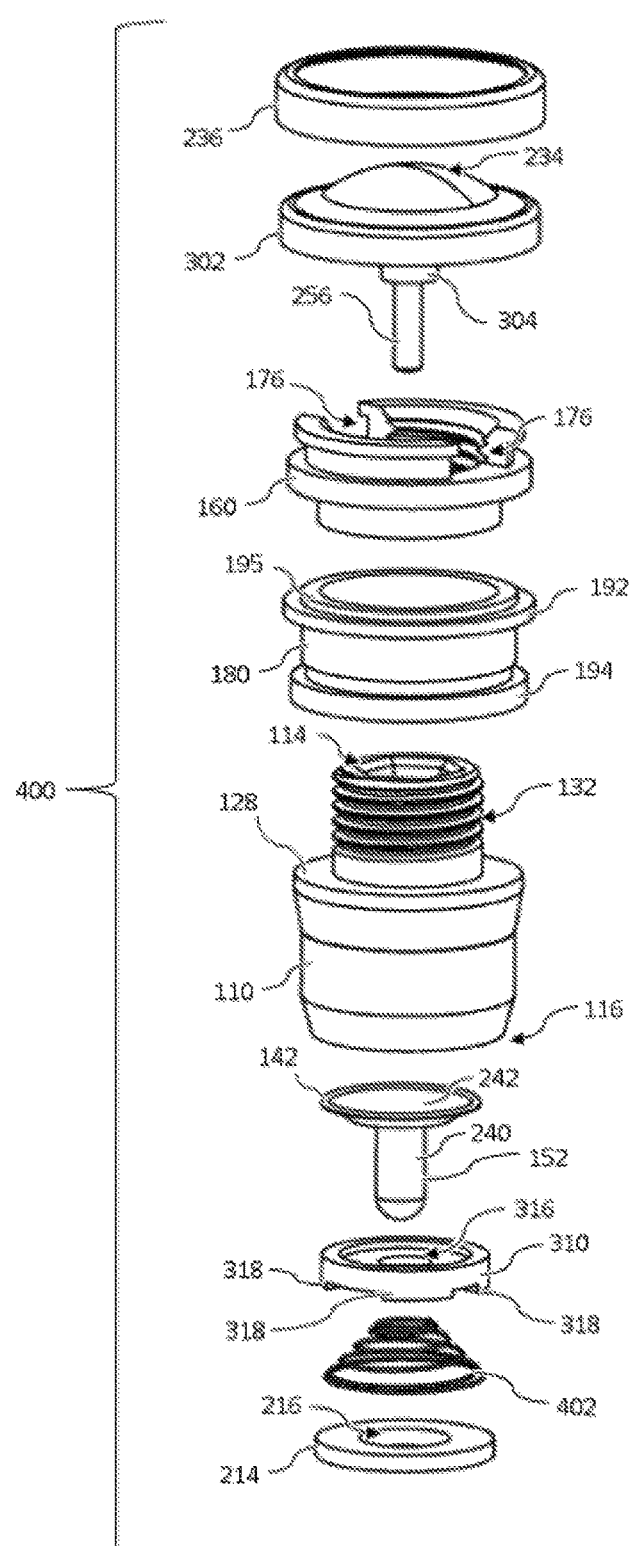
FIG. 11 schematically depicts an exploded view of the relief valve of FIG. 10 according to one or more embodiments shown and described herein.

Referring collectively to FIGS. 10 and 11, an embodiment of a relief valve 400 is schematically depicted. The relief valve 400 can be substantially the same as the relief valve 300, except the relief valve 400 can utilize an alternative bias member for biasing the valve member 240 towards the valve seat 130. Specifically, the relief valve 400 can comprise a spring 402 that is disposed between the valve member 240 and the second port 116 of the flow path 112. In some embodiments, the spring 402 can be formed from a metallic material such as, but not limited to, stainless steel. In one embodiment, the spring 402 can be compressed between the guide member 310 and the stem retainer 214. Accordingly, the spring 402 can bias the valve member 240 to the closed position with a mechanical force. The mechanical force can be configured for automatic venting, and can be set to a magnitude of less than about 10 grams of force such as, for example, between about 2 grams of force and about 7 grams of force in one embodiment, or between about 4 grams of force and about 5 grams of force in another embodiment. Alternatively, the mechanical force can be configured to mitigate automatic venting. Accordingly, the mechanical force can be set to a magnitude of less than about 50 grams of force such as, for example, between about 10 grams of force and about 45 grams of force in one embodiment, or between about 15 grams of force and about 40 grams of force in another embodiment.

Referring again to FIG. 2, embodiments of the relief valve 100 described herein can be configured for installation in the container 10. In some embodiments, the container 10 can be formed from a moldable material such as, but not limited to, a thermoplastic material. Accordingly, the container 10 can be heated to a heated temperature while being formed in a molding process, e.g., blow molding. For example, the heated temperature can exceed about 120° F. (about 49° C.) such as, for example, greater than or equal to about 150° F. (about 65° C.). Alternatively or additionally, the container 10 can be heated to a heated temperature after being formed. Generally, when the container 10 is at the heated temperature, the container 10 can be in an enlarged state due to thermal growth.

While the container 10 is at the heated temperature, the orifice 12 can be formed within the container 10. The orifice 12 can be formed by any cutting process such as, for example, drilling, punching, or the like. In some embodiments, the orifice 12 can be correspondingly shaped to the relief valve 100. It is noted that, while the orifice 12 and the relief valve 100 are depicted in FIG. 2 as having a substantially circular cross section, the orifice 12 and the relief valve 100 can be provided in any desired cross sectional shape. In some embodiments, the orifice 12 can have a smaller diameter than the diameter of the valve body 110, the valve body sleeve 188 of the gasket 180, or both. For example, the shoulder 128 of the valve body 110 can have a larger diameter than the diameter of the orifice 12. Alternatively or additionally, the valve body flange 194 of the gasket 180 can have a larger diameter than the diameter of the orifice 12. In some embodiments, the valve body 110, the valve body sleeve 188 of the gasket 180, or both can be less than about 15% larger than the orifice 12 such as, for example, between about 5% and about 10% larger in one embodiment. It is noted that the orifice 12 can be formed in a wall of the container 10 or a cap of the container 10.

While the container 10 is at the heated temperature, the relief valve 100 can be inserted into the orifice 12. Specifically, the relief valve 100 can be inserted into the orifice 12 such that the fastener flange 192 of the gasket 180 contacts an outer surface 14 of the container 10. Moreover, the fastener sleeve 186 of the gasket 180 can contact the orifice 12. Accordingly, a majority of the clamping fastener 160 can be located on the exterior of the container 10. A majority of the valve body 110 can be located on the interior of the container 10. The shape of the outer contour 112 of the valve body 110 can be configured to facilitate insertion of the orifice 12. Although the valve body 110 has a larger diameter than the orifice 12, the sloped region 129 can be configured to deform the orifice 12 to permit installation. Moreover, the chamfered region 124 of the valve body 110 can facilitate the use of robots for inserting the relief valve 100 into the orifice 12. Furthermore, the recess 196 of the gasket 180 can permit the valve body flange 194 to deform to facilitate insertion into the relatively small orifice 10. It is noted that inserting the relief valve 100 into the orifice 12, while the container 10 is at the heated temperature, can enhance the elasticity of the container 10 and reduce damage to the relief valve 100 and the container 10.

The threaded engagement between the valve body 110 and the clamping fastener 160 can be adjusted to compress the gasket 180. Specifically, a span between the shoulder 128 of the valve body 110 and the clamping flange 168 of the clamping fastener 160 can be reduced. Accordingly, the gasket 180 can be deformed and enlarged such that the fastener sleeve 186 of the gasket 180 is urged into contact and forms a fluidic seal with the orifice 12. In some embodiments, the clamping fastener 160 can be urged towards the outer surface 14 of the container 10 contemporaneous to the adjustment of the threaded engagement.

Upon inserting the relief valve 100 into the orifice 12 of the container 10, the container 10 can be permitted to cool. Accordingly, the diameter of the orifice 12 can be reduced after the gasket 180 forms the fluidic seal with the orifice 12. In some embodiments, when the temperature of the container 10 is reduced from the heated temperature to room temperature (about 68° F. or about 20° C.), the diameter of the orifice 12 can be reduced. In some embodiments, the diameter of the orifice 12 can be reduced by less than about 4% such as, for example, less than or equal to about 2% in one embodiment. Specifically, in one embodiment, when the orifice 12 has a diameter of about 1 inch, the diameter can be reduced by about 20 thousandths of an inch. It is noted that reducing the diameter of the orifice 12, after the gasket 180 forms the fluidic seal with the orifice 12, can improve the quality of the fluidic seal to reduce fluid leakage and mitigate undesired separation of the relief valve 100 from the container 10.

It should now be understood, the embodiments described herein relate to relief valves that are durable and relatively simple to install into a container. For example, the relief valves can make use of a magnetic member to bias the relief valve to a closed position. The relief valve can be actuated repeatedly without fatiguing the magnetic member, which can extend the number of actuation cycles the relief valve can be utilized. Moreover, the relief valves described herein can include a ferromagnetic insert, which can extend the amount of time the relief valve can be exposed to caustic materials by facilitating the use of more durable materials to form the relief valve. The relief valves described herein can be shaped to enhance sealing and mitigate separation from plastic containers. It is furthermore noted that the shape of the relief valves can facilitate installation with a container during or after manufacture.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A relief valve comprising:
   a valve body defining a flow path that extends between a first port and a second port, the valve body comprising a valve seat disposed between the first port and the second port, a shoulder disposed along an outer contour of the valve body between the first port and the second port, and a sloped region disposed along the outer contour of the valve body between the shoulder and the second port, wherein the valve seat forms a discontinuity in the flow path, and wherein the outer contour tapers inward at the sloped region;

a valve member disposed between the valve seat and the second port of the valve body, wherein the valve member moves along an actuation axis;

a bias member disposed between the valve member and the second port of the valve body, wherein the bias member generates a force that urges the valve member to seal with the valve seat of the valve body;

a clamping fastener in threaded engagement with the valve body; and a gasket disposed between the clamping fastener and the valve body, wherein the gasket comprises a fastener sleeve interfacing with the clamping fastener and a valve body sleeve interfacing with the valve body.

2. The relief valve of claim 1, wherein the fastener sleeve and the valve body sleeve overlap to form a shoulder of the gasket.

3. The valve of claim 1, wherein the clamping fastener comprises a flow orifice formed laterally through the clamping fastener with respect to an actuation axis.

4. The relief valve of claim 3, further comprising a resilient cap coupled to the clamping fastener, wherein the flow orifice extends from a first end of the clamping fastener to a bottom of the flow orifice, and wherein the resilient cap is offset from the bottom of the flow orifice by a vent span.

5. The relief valve of claim 4, further comprising a valve stem that is coupled to the resilient cap and extends towards the valve member, wherein the valve stem is offset from the valve member by an actuation span.

6. The relief valve of claim 1, wherein the gasket comprises a resilient material having a hardness between about 40 duro and about 85 duro.

7. The relief valve of claim 6, wherein the resilient material is one of a fluoroelastomer, a nitrile rubber, urethane, and a chlorinated polyethylene.

8. The relief valve of claim 1, wherein the valve body sleeve of the gasket comprises a valve body flange, and wherein the valve body flange and the valve shoulder in contact.

9. The relief valve of claim 8, wherein the valve body flange is larger than the valve shoulder.

10. The relief valve of claim 8, wherein the valve body sleeve of the gasket comprises a recess formed between the shoulder and the valve body flange.

11. The relief valve of claim 1, wherein the bias member comprises one of a magnetic member and a spring.

12. The relief valve of claim 1, wherein the force is one of:

a magnetic force that has a magnitude less than about 10 grams; and a mechanical force that has a magnitude less than about 10 grams.

13. The relief valve of claim 1, wherein the valve body comprises a chamfered region adjacent to the second port.

14. The relief valve of claim 13, wherein the chamfered region defines a chamfer angle with respect to the second port, and wherein the chamfered angle is acute.

15. The relief valve of claim 1, wherein the valve body is formed from a first body comprising the first port and a coupling flange, and a second body comprising the shoulder, and wherein the coupling flange of the first body is received by the second body; and wherein the first body comprises a metallic material, and the second body comprises a rigid plastic.

* * * * *